United States Patent [19]

Asmus, Jr.

[11] 4,159,955
[45] Jul. 3, 1979

[54] FOOD DISPENSING BIN
[76] Inventor: David Asmus, Jr., Rte. 1, Box 582, Laramie, Wyo. 82070
[21] Appl. No.: 849,758
[22] Filed: Nov. 9, 1977
[51] Int. Cl.$^2$ .............................................. B01D 23/02
[52] U.S. Cl. .................................... 210/473; 210/498; 141/108
[58] Field of Search ................ 209/397, 352; 210/514, 210/473, 498; 99/410, 408, 450; 141/108, 392, 286, 86–88, 98; 193/2 R; 53/390

[56] References Cited
U.S. PATENT DOCUMENTS
3,721,063 3/1973 Weimer .................................. 53/390

Primary Examiner—Houston S. Bell, Jr.
Attorney, Agent, or Firm—Hugh H. Drake

[57] ABSTRACT

For dispensing segmental food pieces such as french fries, a bin has a perforated wall which extends from the front horizontally toward the rear. That wall then curves upward and reentrantly so as to be capable of captivating food segments urged toward the rear. Upright side walls extend along each side margin and have a height sufficient to form a closure of the reentrant portion of the bottom wall. A cutout, in one of those side walls, facilitates handling of the foodstuff and loading of the bin.

7 Claims, 4 Drawing Figures

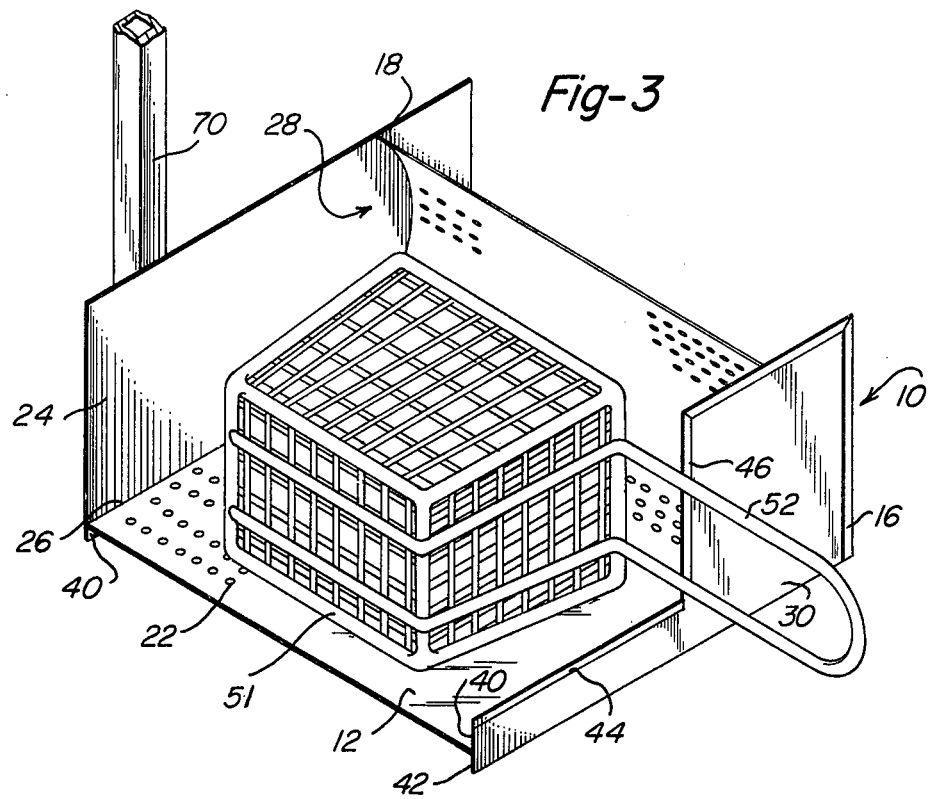
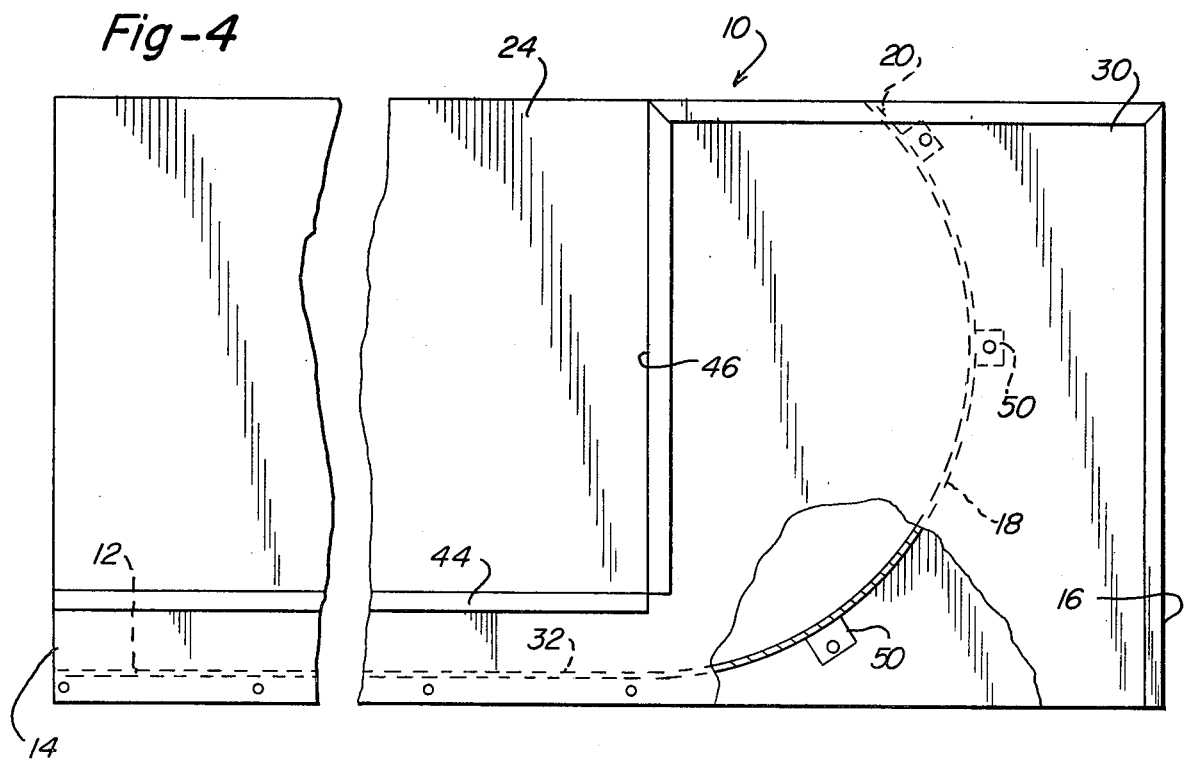

FOOD DISPENSING BIN

The present invention relates to a food dispensing bin. More particularly, it relates to a bin designed for the handling of food segments wherefrom the drainage of liquid is desirable.

A segmental foodstuff such as french fried potatoes typically is deep fried in a vat of heated oil while being carried in a porous-walled basket. When the fries have been cooked sufficiently, the basket often is suspended above the vat so as to allow drainage of the oil. Thereafter, the fries may be shaken from the basket upon tilting thereof, or they may be scooped out by use of a suitable utensil. In either case, such a procedure of serving the cooked fries is at best awkward. Attempting to scoop the fries from the basket also results in damage to individual ones of the segments.

In an effort toward facilitating the serving of cooked french fries and the like into carry-away containers such as paper bags, R. E. Weimer, in his U.S. Pat. No. 3,255,570, teaches the placing of the fries on a tabletop having a stop at the rear and the gathering of those fries by use of a particularly shaped scoop. That scoop may be used to urge a bunch of the fries toward the upright rear portion so as to captivate a portion of the fries within the scoop and thereafter allow them to be dumped into a suitable bag. The table assembly includes a rack at one side for supporting filled bags.

Recognizing deficiencies in the foregoing approach, R. E. Weimer in U.S. Pat. No. 3,721,063 disclosed the use of a perforated trough for draining and supporting french fried potatoes from which the potatoes could be withdrawn by use of the scoop mentioned in the earlier patent. Associated with the trough is a dispensing section that includes a tray which rotatably mounts a carousel which provides a plurality of support stations for seating a plurality of bags in a circular array. The arrangement includes means to insure that potato segments which have been spilled are promptly carried away for return to the filling trough. While the resultant assemblage is probably quite advantageous, it includes such complexity of mechanical construction as to make it expensive and somewhat difficult of cleaning for sanitary purposes.

Of course, other apparatus is known for holding foodstuffs such as this while having underlying perforations or apertures which permit drainage therefrom. The simple colander often found in the home kitchen is one example. More involved drainage apparatus is shown, for example, in U.S. Pat. No. 2,865,508 issued to C. E. Nock.

All considered, the simplicity of segregating and loading as taught in the earlier of the aforesaid Weimer patents is highly desirable. However, the added complexity of food handling apparatus such as that shown in the later of the aforesaid Weimer patents or in the patent to Nock are not nearly as desirable either from the standpoint of cost of the equipment or the labor involved in cleaning.

It is, accordingly, a general object of the present invention to provide a food dispensing bin which attains the best of the objectives of the foregoing prior art, while at the same time avoiding the disadvantages thereof.

Another object of the present invention is to provide a new and improved food dispensing bin which is simple and inexpensive of manufacture and yet which is capable of being cleaned with a minimum of effort.

A further object of the present invention is to provide a new and improved food dispensing bin which facilitates service of foods therefrom in an easy and appropriate manner.

In accordance with the present invention, a food dispensing bin is composed of a perforated bottom wall that extends from the front of the bin horizontally toward near the rear of the bin and then smoothly curves upward and reentrantly as to captivate food segments urged toward the rear of the bin. The perforations in the bottom wall are of a size to permit drainage of liquid from the segments carried on that bottom wall. A first upright side wall extends from the front to the rear of the bin along one side margin of the bottom wall and has a height sufficient to form a closure of the reentrant portion of the bottom wall. A second upright side wall extends from the front to the rear of the bin along the other side margin of the bottom wall. It also has a height sufficient to form a closure of the reentrant portion of the bottom wall. In accordance with a futher feature, the second side wall extends from the front toward the rear of the bin at a height substantially less than the height at the rear for a major portion of the distance between the front and rear of the bin.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 3 is a fragmentary perspective view similar to FIG. 1 but showing an alternative association of a component which may be used therewith; and FIG. 4 is a side-elevational view, fragmentary and partially broken away, of the embodiment of FIG. 1.

Figure 1:
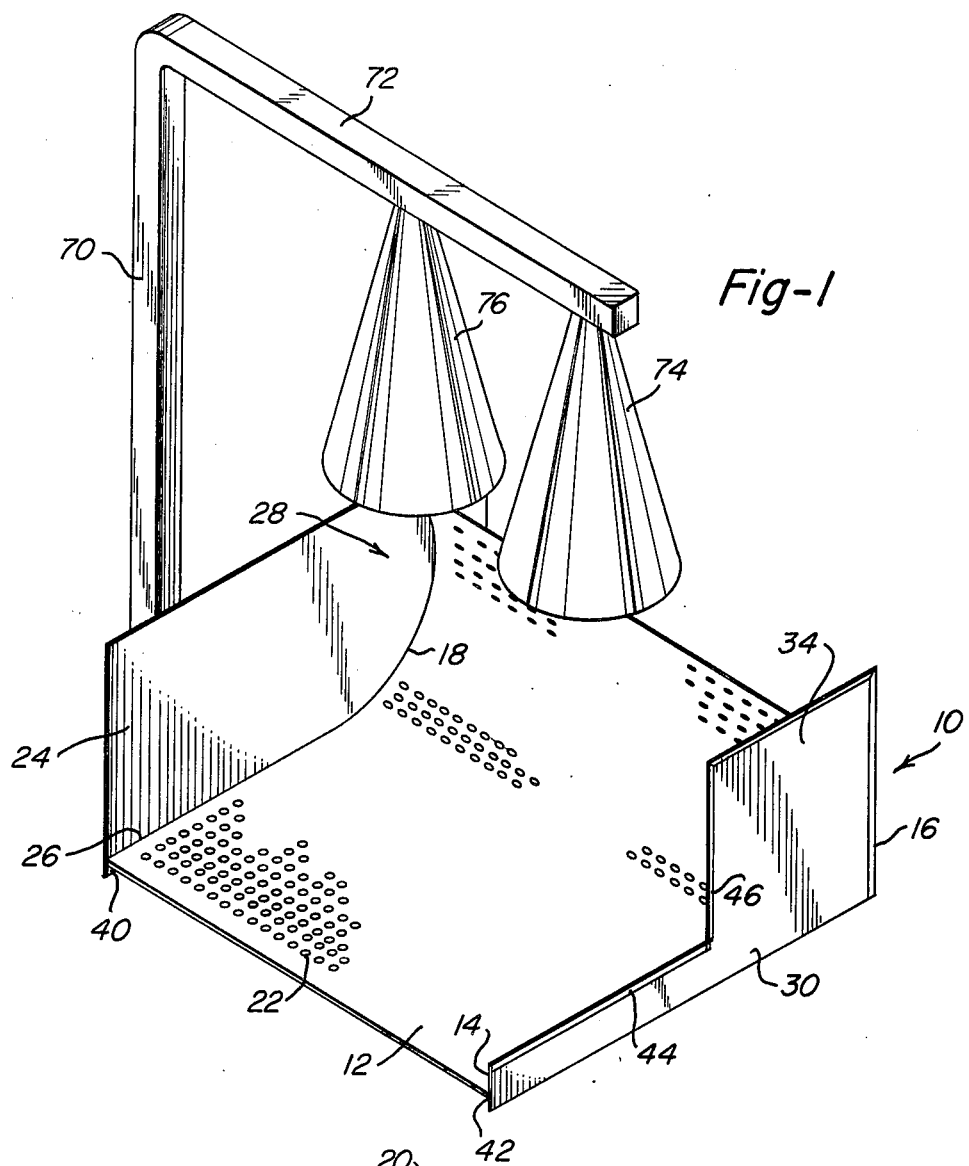
FIG. 1 is a perspective view of a preferred embodiment of a food dispensing bin.

A food dispensing bin 10 has a perforated bottom wall 12 that extends from the front 14 of the bin horizontally toward near the rear 16 where that bottom wall curves upwardly as at 18 and reentrantly at the top, as at 20, so as to captivate carried food segments as they may be urged toward the rear of the bin. Perforations 22 in wall 12 are sized to permit the drainage of liquid, such as cooking oil, from the food segments which may be carried on bottom wall 12 and typically are cooked french fried potatoes. Those perforations need not extend all of the way to the top of the reentrant portion 20. However, it appears to be most economical to form the entirety of the horizontal portion of wall 12, curved portion 18 and reentrant portion 20 all of a single continuous piece of perforated material such as stainless steel.

A first upright side wall 24 extends from the front to the rear of bin 10 along one side margin 26 of bottom wall 12 and has a height sufficient to form a closure 28 of the reentrant portion of bottom wall 12. A second upright side wall 30 also extends from the front to the rear of bin 10 along the other side margin 32 of bottom wall 12 and has a height in the vicinity of rear 16 sufficient to form another closure of the opposite end of the reentrant portion of the perforated bottom wall as indicated at 34. As shown particularly in FIGS. 3 and 4, side walls 24 and 30 project rearwardly of bin 10 a substantial distance beyond the upwardly curved and reentrant portions 18 and 20 of bottom wall 12. Moreover, the lower marginal portions 40 and 42 of side walls 24 and 30, respectively, project below the horizontal portion of bottom wall 12.

The height of side wall 24 remains the same from the front to the rear of bin 10. In contrast, the height of opposite side wall 30 is substantially reduced over a portion 44 from the front of the bin to approximately the location of the upwardly curved and reentrant portions 18 and 20 of bottom wall 12. Thus, the reduced height of the more forward portion of side wall 30 constitutes a cutout 46. Cutout 46 covers a major portion of the distance between the front and rear of bin 10, although side wall 30 extends for the balance of the distance to the rear of the bin at the height of the rear wall established for the bin by upwardly curved portion 18 and reentrant portion 20.

Bottom wall 12 is shown in the illustrated embodiment as being secured to side walls 24 and 30 by means of tabs 50 into which suitable sheet metal screws are secured through the side walls. The entire structure, therefore, is composed primarily only of the two opposing side walls and the reentrantly-formed bottom wall.

In use as a dispenser, bin 10 may be loaded with cooked french fries or other segmental foods simply by dumping such foodstuff into the bin on top of the tray formed by the horizontal bottom wall. As shown in FIG. 3, for example, a typical deep-fry basket 51 is tilted over into bin 10 in order to empty its contents into the bin. Cutout 46 readily accommodates the handle 52 of basket 51.

Figure 2:
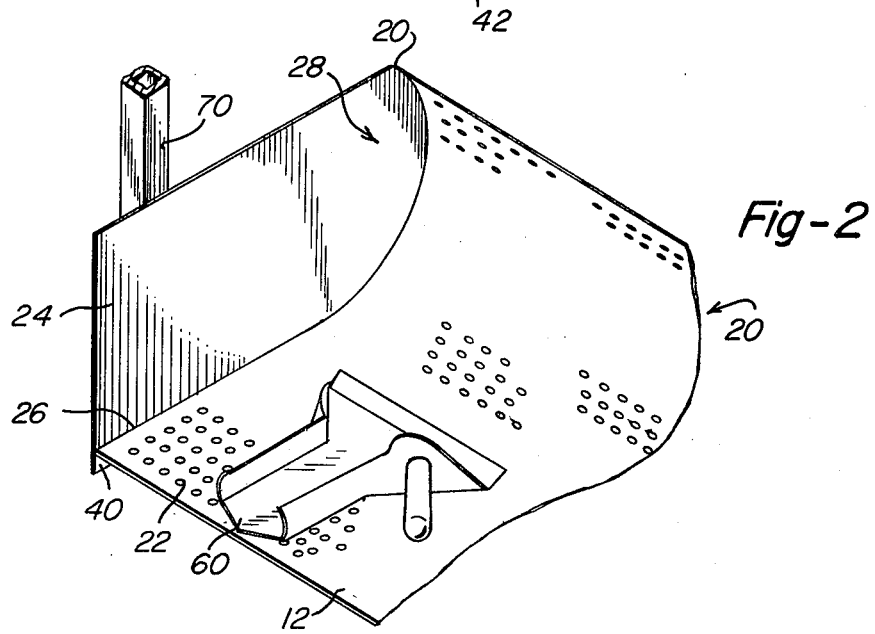
FIG. 2 is a fragmentary perspective view of a portion of FIG. 1 and illustrating the use of a desirably associated component.

A preferred mode of usage of the bin in order to enable the recovery and subsequent dispensing of selected quantities of contained french fries, as into a paper sack or the like, is to employ a scoop 60 as shown in FIG. 2 and which may be like the scoop illustrated in the aforenoted U.S. Pat. No. 3,255,570. The french fries, which have been allowed to drain by means of perforations 22, are urged against upwardly curved and reentrant portions 18 and 20 so as to insure filling of scoop 60. When the bin is somewhat empty of its contents, upwardly curved portion 18 and reentrant portion 20 assist in loading scoop 60 with the last of the segments. Conversely, when bin 10 is substantially filled with french fries, reentrant portion 20 serves to captivate the contained french fries and prevent them from being caused to spill over to the rear of the bin.

Other types of scoops or ladles may conveniently be employed. For example, an elongated scoop of the type conventionally used to gather ice cubes may be employed either endwise as for scooping in the manner shown in FIG. 2 or sidewise (taking advantage of cutout 46) as shown for basket 51 in FIG. 3. When the fries are gathered directly into a container such as a plastic cup, it will be apparent that cutout 46 serves to allow that container to be guided clear to the rear of bin 10 without interference to the hand or arm of the person involved in the process of collection and filling.

Downwardly projecting margins 40 and 42 permit bin 10 to be spaced slightly above a lower drainage-collecting tray upon which it is mounted. The rearward projections of side walls 24 and 30 beyond upwardly curved portion 18 permit liquids pressed outwardly through the perforations in that region to drain downwardly to an underlying tray. Of course, either side wall may have the provision of cutout 46. Which of the side walls is cut out might depend upon the association of the serving bin with other apparatus on the usual counter. In some cases, both side walls might have such a cutout, although greater capacity will be achieved if at least one of the side walls is at full height from front to rear.

Preferably included adjacent to one of the side walls, such as side wall 24, is an upright stand 70. Projecting laterally over bin 10 is a bracket 72 from which depend a pair of downwardly directed intra red heat lamps 74 and 76. Of course, in the usual manner of food serving, those heat lamps are of an intensity sufficient to keep the french fries warm while yet not unduly causing additional cooking or dehydration.

Considering all of the foregoing, it will be observed that bin 10 serves to permit drainage of collected french fries or the like, the easy retrieval of those french fries from the bin for serving and a simplicity of structure which permits ready cleaning. That same degree of simplicity enables construction of the bin with somewhat minimum expense. The overall approach makes it easy to accommodate the dimensioning of the bin to existing underlying drainage facilities and other considerations of usage of available counterspace.

While a particular embodiment of the invention has been shown and described, and various modifications have been mentioned, it will be obvious to those skilled in the art that changes and further modifications may be made without departing from the invention in its broader aspects, and, therefore, the aim in the appended claims is to cover all such changes and modifications as fall within the true spirit and scope of the invention.

I claim:

1. A food dispensing bin comprising:
   a perforated bottom wall extending from the front of said bin horizontally toward near the rear of said bin and then smoothly curving upward and reentrantly as to captivate food segments urged toward the rear of said bin, the perforations in said bottom wall being of a size to permit drainage of liquid from said segments carried on said bottom wall;
   a first upright side wall extending from the front to the rear of said bin along one side margin of said bottom wall and having a height sufficient to form a closure of the reentrant portion of said bottom wall;
   and a second upright side wall extending from the front to the rear of said bin along the other side margin of said bottom wall and having a height sufficient to form a closure of the reentrant portion of said bottom wall.

2. A food dispensing bin as defined in claim 1 in which both said first and second side walls project rearwardly of said bin a substantial distance beyond the upwardly curved and reentrant portion of said bottom wall.

3. A food dispensing bin as defined in claim 1 in which both said first and second side walls project below the horizontal portion of said bottom wall.

4. A food dispensing bin as defined in claim 1 in which the height of said first wall remains the same from the front to the rear of said bin and in which the height of said second wall is substantially reduced from the front of said bin to approximately the upwardly curved and reentrant portion of said bottom wall.

5. A food dispensing bin as defined in claim 1 in which the height of said second wall is substantially reduced from the front of said bin to approximately the upwardly curved and reentrant portion of said bottom wall.

6. A food dispensing bin comprising:
   a perforated bottom wall extending from the front of said bin horizontally to the rear of said bin and then turning upwardly to form a rear wall of said bin, the perforations in said bottom wall being of a size to permit drainage of liquid from food segments carried on said bottom wall;
   a first upright side wall extending all of the way from the front to the rear of said bin at the height of said rear wall;
   and a second upright side wall extending from the front toward the rear of said bin at a height substantially less than the height of said rear wall, for a major portion of the distance between the front and rear of said bin, and extending the balance of the distance to the rear of said bin at the height of said rear wall.

7. A food dispensing bin as defined in claim 6 in which said rear wall curves reentrantly upward.

* * * * *